US011879489B2

(12) United States Patent
Magunia et al.

(10) Patent No.: US 11,879,489 B2
(45) Date of Patent: Jan. 23, 2024

(54) METHOD FOR COVERING A SCREW HEAD IN A SEALED MANNER

(71) Applicant: Lisa Dräxlmaier GmbH, Vilsbiburg (DE)

(72) Inventors: Robert Magunia, Geisenhausen (DE); Nina Pogadl, Landshut (DE)

(73) Assignee: LISA DRÄXLMAIER GmbH, Vilsbiburg (DE)

(*) Notice: Subject to any disclaimer, the term of this patent is extended or adjusted under 35 U.S.C. 154(b) by 143 days.

(21) Appl. No.: 17/623,632

(22) PCT Filed: Jul. 2, 2019

(86) PCT No.: PCT/DE2019/200067
§ 371 (c)(1),
(2) Date: Jul. 8, 2022

(87) PCT Pub. No.: WO2021/000978
PCT Pub. Date: Jan. 7, 2021

(65) Prior Publication Data
US 2022/0333633 A1 Oct. 20, 2022

(51) Int. Cl.
*B05D 1/02* (2006.01)
*F16B 33/00* (2006.01)
*B05C 5/02* (2006.01)

(52) U.S. Cl.
CPC ............ *F16B 33/00* (2013.01); *B05C 5/0212* (2013.01); *B05D 1/02* (2013.01)

(58) Field of Classification Search
CPC ................. B05D 1/02; B05C 5/0212
See application file for complete search history.

(56) References Cited

U.S. PATENT DOCUMENTS

2007/0042123 A1* 2/2007 Endregaard ......... B05B 13/0452
  118/313
2015/0064357 A1* 3/2015 Tomuta ................. A46B 11/063
  401/287

(Continued)

FOREIGN PATENT DOCUMENTS

DE   102010001454 A1   8/2011
EP        1733799 A1    6/2006

(Continued)

OTHER PUBLICATIONS

JPH10165860ATRANSLATION.

(Continued)

*Primary Examiner* — Nathan H Empie
(74) *Attorney, Agent, or Firm* — BelayIP

(57) ABSTRACT

A method for covering a screw head of a screw which penetrates through a workpiece surface in a sealed manner by means of a viscous coating material is disclosed. The method includes the steps of applying a first strip of the viscous coating material onto the workpiece surface at a first inclination relative to the workpiece surface, the first strip of the viscous coating material, after having been applied, at most partially covering the screw head; and applying a second strip of the viscous coating material to the workpiece surface at a second inclination relative to the workpiece surface, the second strip of the viscous coating material, after having been applied, overlapping the first strip in such a way that the screw head is fully covered, the first inclination and the second inclination being opposite one another. The invention furthermore relates to an application system.

11 Claims, 4 Drawing Sheets

(56) References Cited

U.S. PATENT DOCUMENTS

2017/0066231 A1    3/2017  DeFillipi et al.
2017/0106397 A1*  4/2017  Akaishi .................. A46B 13/02
2017/0282196 A1* 10/2017  Boomer ................... B05D 1/38
2019/0001367 A1*  1/2019  Liu ........................... B05C 9/08

FOREIGN PATENT DOCUMENTS

EP        2842457 A1    3/2015
JP        H10165860 A   6/1998
JP       2002052362 A * 2/2002

OTHER PUBLICATIONS

EP1733799A1TRANSLATION.
DE102010001454A1TRANSLATION.
PCT/DE2019/200067 International Search Report (in German).
PCT/DE2019/200067 International Search Report (in English).
PCT/DE2019/200067 Written Opinion (in German).
PCT/DE2019/200067 Written Opinion (in English).

* cited by examiner

METHOD FOR COVERING A SCREW HEAD IN A SEALED MANNER

CROSS REFERENCE TO RELATED APPLICATIONS

This application is a national phase application of international application PCT/DE2019/200067, filed Jul. 2, 20219, the content of which is herein incorporated by reference.

BACKGROUND OF THE INVENTION

The present disclosure relates to a method for covering a screw head of a screw and to an application system.

Screw connections can be used to fix components to each other. For example, energy storage devices or batteries for motor vehicles generally have a metallic construction which have, for example, a rigid frame, which may in particular be made of aluminum, as well as a base and a cover. To protect the battery cells and electronics and to meet the EMC requirements, the cover may be screwed, for example, by a robot at a screw distance of 6.5 cm. The pre-punched screw holes in the cover are kept larger to accommodate any possible degree of screwing. In this case, it may happen that slightly offset screws can no longer completely cover the opening and therefore the housing becomes leaky.

When building batteries, for example, a housing is closed with a lid. In order to be able to disassemble the lid, the lid can be screwed on and/or glued on. In order to meet requirements for electromagnetic compatibility, EMC, it is particularly screwed, wherein the cover can be equipped with holes for screwing. At a distance of 6.5 cm, for example, screws can be screwed into the frame of the lid. Depending on the size of the batteries, this can be 200 screws per workpiece, for example. Due to the complex screw driving technology and the large tolerances of the screws, the joining process does not lead to 100% tightness in the area of the mechanical interface. For a functioning battery, a tightness of the screw connection is advantageous for the life of, for example, the battery.

The screw driving process and the tolerances of the screws and the lid can lead to a number of conditions that leave a leaky screw connection, for example, strongly offset, obliquely screwed, too high, chip under the head, head torn off, etc.

FIG. 1a schematically depicts an arrangement with a screw connection with screws 101 and a cover 103. The screws 101 protrude through the cover 103. The screws have a screw head 105 which rests on a surface 107 of the cover 103. FIG. 1b depicts the detail from FIG. 1a in a different perspective.

One possible approach to seal the screws 101 and at the same time protect against corrosion is a downstream application process in which a coating material 109, in particular an adhesive/sealing compound, is sprayed over the screws 101.

Various methods are known for sealing screw heads 105. One of these is the application of an adhesive/sealing compound, i.e., adhesive and/or sealing compound, using various techniques. In addition to the difficult process technique of covering screws 101 without even small air ducts, it may additionally take hours for the coating material 109 to dry, in particular it may take a long time, until the coating material 109 is cured and for a seal test to take place, in particular a non-destructive sealing test. These reactive adhesives/sealants may be moisture-controlled. Drying, i.e., curing, may be dependent on environmental conditions, for example, may be different in summer and winter. Heat-reactive adhesives can be activated with an external energy source but could damage the battery system. When coating on the real component with a 3D structure, this effect becomes amplified. Air ducts 111 form up to the edge of the coating material 109.

FIG. 1c depicts the section of FIG. 1b, with the coating material 109 over the screws 101. However, the behavior changes as soon as a screw head 105 is in the spray path. The screws 101 can cause swirling and tear-out of the coating material 109 with a lateral raising. Under the coating material 109, i.e., under the sealing compound, the air ducts 111 form from the screw 101 to the edge of the coating material 109. In the case of a leaking screw 101, air and/or water can then enter into the battery interior.

BRIEF SUMMARY OF THE INVENTION

It is an object of the present invention to provide an advantageous concept of sealing covering a screw head.

According to a first aspect of the invention, the problem is solved by a method for covering a screw head of a screw, which penetrates through a workpiece surface, in a sealed manner by means of a viscous coating material by:

applying (403) a first strip of the viscous coating material (221) onto the workpiece surface (209) at a first inclination (217) relative to the workpiece surface (209), the first strip of the viscous coating material (221), after having been applied (403), at most partially covering the screw head (207, 303); and applying (404) a second strip of the viscous coating material (221) to the workpiece surface (209) at a second inclination (223) relative to the workpiece surface (209), the second strip of the viscous coating material (221), after having been applied (404), overlapping the first strip in such a way that the screw head (207, 303) is fully covered; wherein the first inclination and the second inclination being opposite to each other.

The process is used for the covering of the screw head with the viscous coating material. That is, the process is used to seal a metallic interface. If the screw was correctly screwed into the workpiece and hermetically sealed the borehole, this screw would be air- and immersion-tight. Because water and other liquids or salts are deposited on the screw during operation on the workpiece, corrosion can occur over time and water could penetrate the workpiece. In the worst case, this can lead to damage.

A subsequent coating process of the exposed surfaces and screw heads with adhesive/sealing compound has proven to be an effective sealing method. This prevents water from accumulating and prevents corrosion.

The process can ensure complete wetting of the screw head. A double coating with the alignment of a nozzle at a specific angle can be advantageous for sealing. A sealing coating can thereby be applied to a metallic interface. The method represents a fast process, in particular from application to sealing testing, and an advantageous connection of the adhesive/sealing compound to the screws. A sealing coating can be provided which is stable in the long term due to the position and shape of the coating and can be adjusted to any coating material.

Reworking of the coated area can be reduced, for example, as fewer leaks are produced and less subsequent sealing is required.

The invention provides a simple structure and process sequence for reliably wetting the screw heads. The process is adjustable to a geometry and shape of the workpiece.

The process can be carried out automatically by an application system, thereby increasing process reliability.

The application system can be a dosage system and enables a consistent, high-quality application, regardless of the viscosity of the coating material. Instead of a full-surface coating, the application is distributed over two strips.

The second strip overlaps the first application and completely seals the screw from above and laterally through the spray angle. This can be checked when looking at the coating of the surface and the screw from below, for example during a destructive density test.

The tightness is not only generated by the application. The adhesive/sealing compound must form a good, in particular a 100%, adhesion with the substrate. The adhesive/sealing compound used can in particular be compatible with the carrier material, that is, the material of the material.

Additional cleaning and/or pretreatment can be carried out. This may be carried out upstream in time or inline with the application.

In one embodiment, the steps of application comprise a continuous process of a nozzle which is arranged to spray the viscous coating material.

The continuous process of the nozzle allows uniform application.

In one embodiment, the first strip is applied and the second strip is applied with opposite application directions of the nozzle. This means that the first strip is applied while the nozzle is moving forward and the second strip is applied while the nozzle is moving backward.

Both strips can be applied in the same direction. Both strips can be applied in opposite directions. An application in opposite directions can be more efficient.

In one embodiment, the application of the second strip takes place within a drying time of the viscous coating material, in particular before a skin has formed on the first strip.

Thus, good adhesion of the viscous coating material applied with the second strip can take place on the viscous coating material of the first strip.

In one embodiment, the workpiece is a battery housing. In particular, the battery housing has battery modules for a vehicle arranged in the battery housing.

The workpiece can be a battery frame with a screwed metal cover. Battery cases can be used in a production process. The efficient process does not slow down the production process.

In one embodiment, the first inclination and the second inclination are each 5° from an orthogonal orientation with respect to the workpiece surface.

The angles at the first strip and the second strip are opposite, in particular +5° and −5° from the orthogonal with respect to the workpiece surface. This means that the inclinations here correspond to 85° and 95° as viewed from the workpiece surface. In a further embodiment, the inclinations vary with respect to each other, for example, the first inclination is 5° from the orthogonal relative to the workpiece surface and the second inclination is 10° from the orthogonal relative to the workpiece surface, opposite to the first inclination.

In a further embodiment, the first inclination and/or the second inclination is 0° each. This may depend on the nozzle being accessible on the workpiece. If, for example, it is not possible to tilt the nozzle for mechanical reasons, the first strip and/or the second strip may be applied without an angle of inclination.

In one embodiment, the partial covering during application of the first strip comprises at least 50% of the surface of the screw head, in particular up to 60% of the surface of the screw head.

That is, a maximum of 50-60% of the first strip can be sprayed to over the screw head. The angle of inclination of at least 5° relative to the orthogonal to the workpiece surface completely covers the lateral surfaces.

In one embodiment, when applying the second strip, the overlap comprises at least 10% of the first strip.

With such an overlap, a tightness between the two strips may be greater than with a lower overlap, since tolerances can be better compensated.

In one embodiment, the method comprises providing the viscous coating material, in particular providing a two-component material as a viscous coating material.

A booster or a two-component product can be used for quick curing. For example, in the battery production process, a leak test is carried out after the so-called assembly of the hardware, which can be carried out with negative pressure or overpressure. In order for this leak test to be carried out in time with the production process, the adhesive/sealing compound must already be sufficiently mature to ensure that the coating is not destroyed by the pressure test. The booster can be used for fine seam sealing, in particular for accelerated curing. The two components can be TEROSON MS 9320 SF and, as Booster 9371 B WH. For example, the booster can be used to check for tightness after just 42 minutes. The two-component material can be wet soot or another material, in particular a soot-free formulation containing a —OH-containing compound in the form of ethane-1,2-diol instead of water.

After the formation of a non-accelerated sealing compound, the coating can be destroyed during the overpressure test because the air can press into the coating and lead to a defective sealing seam. Rapid curing by the two-component product can result in complete cure by the time of the density test. Alternatively, the material can also be selected in such a way that a density test can be carried out before skin is formed.

A two-component dosage system with a static mixing tube can be installed in front of an application head with a so-called FlatStream nozzle. This can reduce the curing time from hours to minutes.

A coating with accelerated cure to density testing is provided, making flexible technology possible for any type of sealing. Further advantages are a reduction of the process time compared to applying a coating material that has only one component. This can also reduce downtimes. In addition, due to the fast drying time of the two-component material, the batteries do not have to be stored temporarily, as the curing does not last for hours.

In one embodiment, the method comprises an optical detection of the application, in particular by a camera, and correction of the application when it is detected that the application deviates from a desired path. The target path can be a pre-programmed path or a path that is determined by a control system on the basis of screw heads detected with the camera and in the application direction in front of the application head.

This can ensure tolerance compensation. The application can be guided by a camera. A successful coating application can also be followed with process cameras. Process parameters of the coating application also influence the adhesion and thus the tightness.

In one embodiment, the method comprises defining an application web, wherein the application web having a length, wherein a drying time of the viscous coating material and an application speed are taken into account when defining the application web.

The programming of the beginning and end of the webs has an influence on the coating. In particular, a length of the first strip and the second strip can be determined based on the drying time of the viscous coating material and an application speed. In this way, too long a coating distance can be divided into several shorter webs.

According to a second aspect, the problem is solved by an application system for covering a screw head of a screw, penetrating a workpiece surface, comprising a viscous coating material, having an application head adapted to apply the viscous coating material to the workpiece surface in a first strip at a first inclination with respect to the workpiece surface and in a second strip at a second inclination with respect to the workpiece surface, wherein the first inclination and the second inclination are opposite to each other; and a control set up to adjust the first inclination and the second inclination and to control the application head so that, when the first strip of the viscous coating material is applied to the workpiece surface, the screw head is at most partially covered and, when the second strip of the viscous coating material is applied to the workpiece surface, the second strip of the viscous coating material overlaps the first strip after application in such a way that the screw head is completely covered.

The first strip can be programmed so that the screw head is not completely covered. The second strip can be programmed to cover everything. The overall width of the application can be selected to accommodate any tolerance of the screws and application problems during application. For example, overlapping can be done as a percentage of the first strip, or the second strip can be done across the entire width of the viscous coating material and/or the screw head.

By setting up such a new mixing and dosage technology, it is technically possible to combine a static mixer and a FlatStream application unit. A nozzle geometry can be adapted accordingly. With so-called airless nozzles, the pressure after the static mixer can be so low that it is no longer possible to spray the mixture. The application system can apply a spray and coating application in which, before spraying, the product is mixed via a static mixing tube and the mixed two-component material is sprayed directly. This highly viscous sealant can be sprayed on using FlatStream. Mixing and application using FlatStream of low- and high-viscosity adhesives and sealants can be achieved. With the application system, sealing and protection of screws is realized by a double application by means of two spray paths at different application angles.

The required curing can be obtained by adding a second component, such as a booster or isocyanate, and heat. The reaction speed can be controlled by heating the components. Spray properties and the resulting tightness of the screws within a specified time can be temperature-dependent. The control system can be set up to regulate the temperature, in particular to regulate the temperature of the viscous coating material and/or the nozzle.

The implementation of this coating process in combination with the dual application can be carried out depending as a function of the cycle time of the manufacturing process. This makes it possible, for example, to produce air- and submersible-tight batteries with a process time of less than 60 minutes.

In one embodiment, the application head comprises a nozzle and two ports, wherein the two ports can be connected to different containers and are arranged to convey two components of a two-component material to the nozzle.

In this regard, the nozzle may comprise a screw structure that may contribute to homogeneous mixing.

In one embodiment, the control system is arranged to refer the first inclination and the second inclination to a lot to the workpiece surface. This means that the control system determines the inclinations based on a basic orthogonal alignment of the nozzle. The lot corresponds to the orthogonal to the workpiece surface.

In one embodiment, the control system is set up to determine a length of the first strip as a function of a drying time of the viscous coating material and a speed of the application head.

The application can be carried out, for example, by means of a process such as FlatStream, Airless, E-Swirl. When developing the coating with FlatStream and a suitable nozzle, a good and homogeneous closed spray pattern can be achieved on a flat plane. The material can be selected in such a way that it does not flow away at the edges of the first or second strip, but rather folds up. Rheological adjustments are possible.

BRIEF DESCRIPTION OF THE DRAWINGS

Further advantages features and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination recited but also in other combinations on their own, without departing from the scope of the disclosure.

In the following, the invention is described in more detail with reference to examples of embodiments and the figures, wherein:

FIG. 1b depicts a further schematic representation of the arrangement according to FIG. 1a;

FIG. 2b depicts a further schematic representation of the arrangement in FIG. 2a;

FIG. 3b depicts a further schematic representation of the arrangement according to FIG. 3a;

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C" then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of 'A, B, and C'" should be understood as including only one of A, only one of B, only one of C, or any combination.

In the following detailed description, reference is made to the accompanying drawings which form a part hereof and which are shown, by way of illustration, specific embodiments in which the invention may be carried out. It is understood that other embodiments may be used and structural or logical changes may be made without deviating from the concept of the present invention. Therefore, the following detailed description is not to be understood in a restrictive sense. It is further understood that the characteristics of the various embodiments described herein may be combined, unless specifically stated otherwise.

The aspects and embodiments are described by reference to the drawings, with the same reference signs generally referring to the same elements. The following description sets out a number of specific details to provide an in-depth understanding of one or more aspects of the invention. However, it may be obvious to a skilled person that one or more aspects or embodiments can be carried out with a lower degree of specific detail. In other cases, known structures and elements are shown in a schematic form to facilitate the description of one or more aspects or embodiments. It is understood that other embodiments may be used and structural or logical changes may be made without deviating from the concept of the present invention.

Figure 1A:
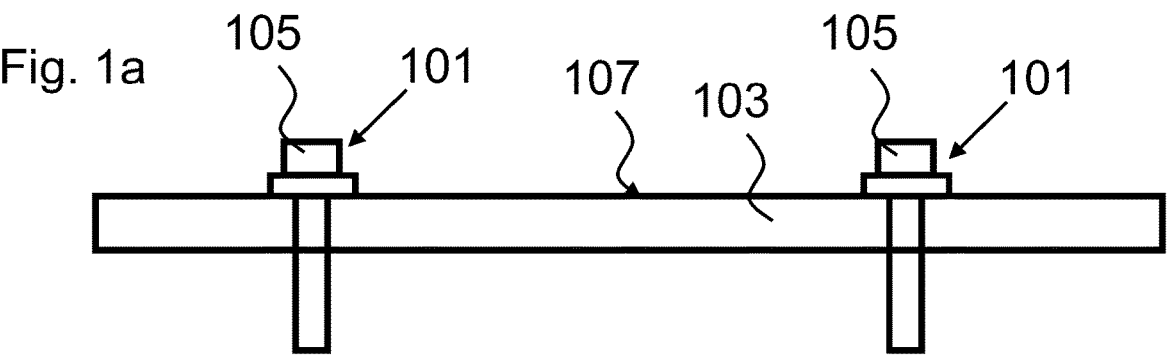
FIG. 1a depicts a schematic representation of an arrangement.
Figure 1B:
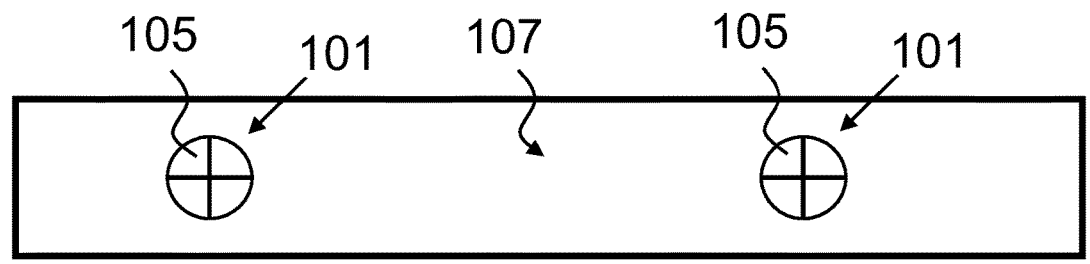
Figure 1C:
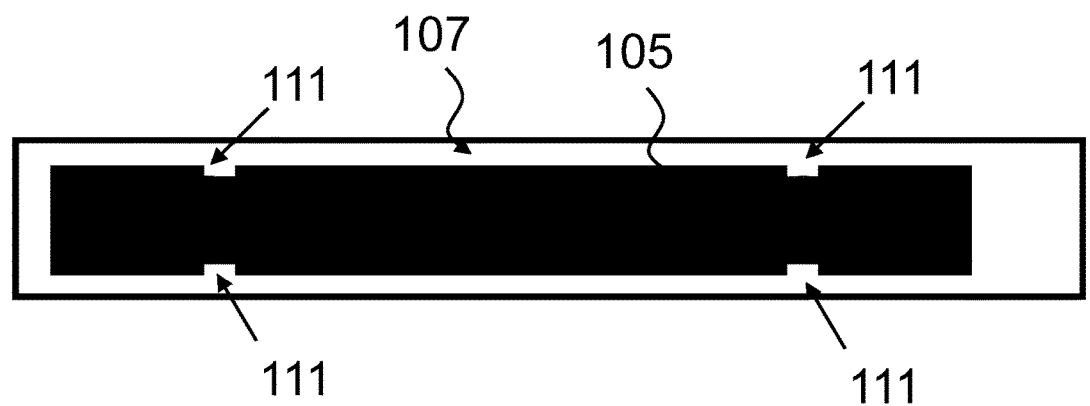
FIG. 1c depicts a schematic representation of an arrangement according to FIG. 1b with a coating.
Figure 2A:
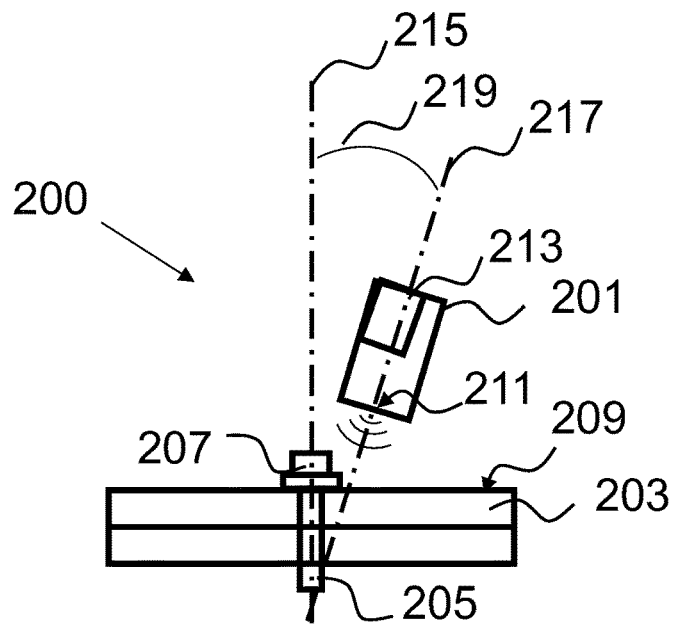
FIG. 2a depicts a schematic representation of an arrangement with an application system according to one embodiment.

FIG. 2a depicts a schematic representation of an arrangement 200 with an application system 201 according to an embodiment. The arrangement 200 depicts a workpiece 203 with a screw 205 having a screw head 207. The screw head 207 substantially rests on a workpiece surface 209. However, in such a connection, it may happen that, for example, due to tolerances, the contact of the screw head 207 on the workpiece surface 209 does not occur completely and/or does not seal the screw 205 securely. In this case, moisture could penetrate through the workpiece 203. The workpiece 203 in this case is a housing of a battery. In a further embodiment, the workpiece 203 is a different housing, which is intended to protect against moisture in particular. The workpiece 203 may have a section to be sealed of, for example 11m in length, resulting from a plurality of individual sections which are arranged on an edge around the housing. For example, the battery may have a width of 1.2 m and a length of 2.3 m with a thickness of 15 cm. In further embodiments, the values may differ.

The application system 201 comprises a nozzle 211 and a controller 213. The nozzle 211 is configured to mix and spray a two-component material and thereby apply it to the workpiece 203. The controller 213 is adapted to control the nozzle 211 and to control a movement of the nozzle 211. In the embodiment shown, the application system 201 is movable. In another embodiment example, the nozzle 211 is movable and the controller 213 is not. The controller 213 can be centrally arranged and, in particular, integrated into a computer system.

The nozzle 211 may be a flat nozzle to produce a flat spray stream, a FlatStream. In particular, the nozzle 211 may have a 3 mm thick gap of 1 cm in length. Through this, a two-component material can be introduced at about 100 bar. The nozzle 211 has a screw-shaped mixing tube, a helix for mixing with, in particular, 24 turns, at the end of which there is a pressure of approx. 30 to 40 bar.

In FIG. 2a an orthogonal 215 to the workpiece surface 209 is drawn and a first inclination 217, which is at a first angle 219 to the orthogonal 215. In this case, the first angle 219 is 5°. In another embodiment, the first angle 219 is a different value, in particular more than 5° to the orthogonal 215. The application system 201 may apply a viscous coating material at the first angle 219, i.e. spray it laterally to the screw head 207. A first strip is formed, in particular during a forward movement of the nozzle 211.

Figure 2B:
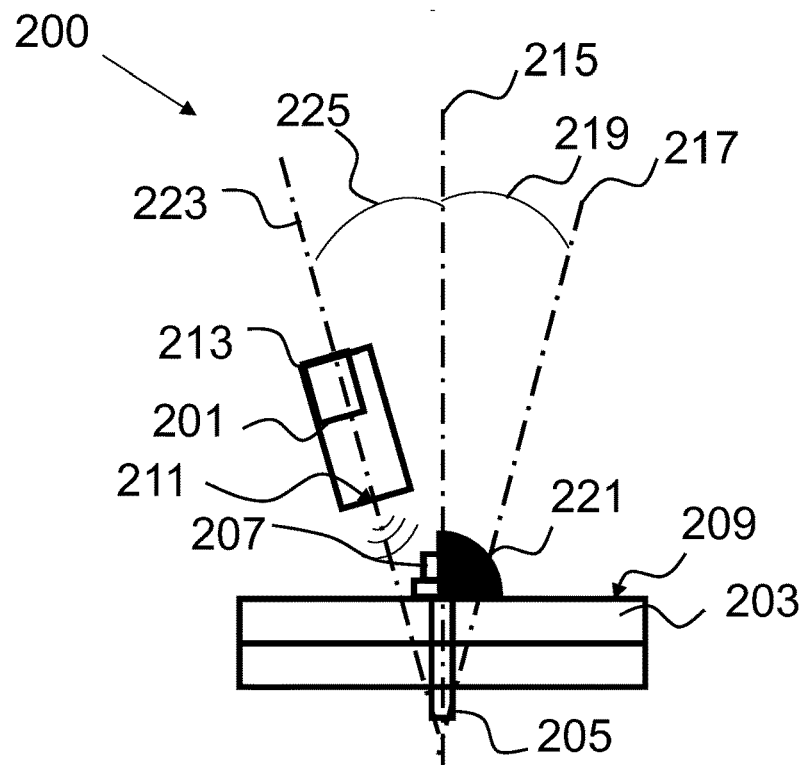

FIG. 2b also depicts, as described with respect to FIG. 2a, the arrangement 200 with the workpiece 203 and the application system 201. A viscous coating material 221 was applied as the first strip during the forward movement. The first strip of the viscous coating material 221 covers 50%. of the screw head 207. In another embodiment, the covering is more or less, in particular between 50% and 60% of the surface of the screw head 207.

The nozzle 211 is inclined in a second inclination 223, that is, arranged at a second angle 225 to the orthogonal with respect to the workpiece surface 209. The second angle 225 is also 5°. In a further embodiment, the second angle 225 has a different value, in particular a different value than the first angle 219, and in particular a smaller value than the first angle 219. The second inclination 223 is arranged with respect to the orthogonal 215 with respect to the workpiece surface 209 on a side opposite to the first inclination 217, with respect to an application direction. Thus, when the viscous coating material 221 is applied for the second time, the rest of the screw head 207 can be completely covered.

In another embodiment example, the first angle is 219 and/or the second angle 225 is 0°. This is particularly dependent on component accessibility. For example, if an inclination of the nozzle 211 of 5° is not possible when applying the second strip, because components of the workpiece 203 are in the way, the application can also be carried out completely or partially at an angle of 0°. Regardless of the inclination when applying the first strip, the screw head 207 is at most partially covered when applying the first strip and the screw head 207 is completely covered by applying the second strip.

Figure 3A:
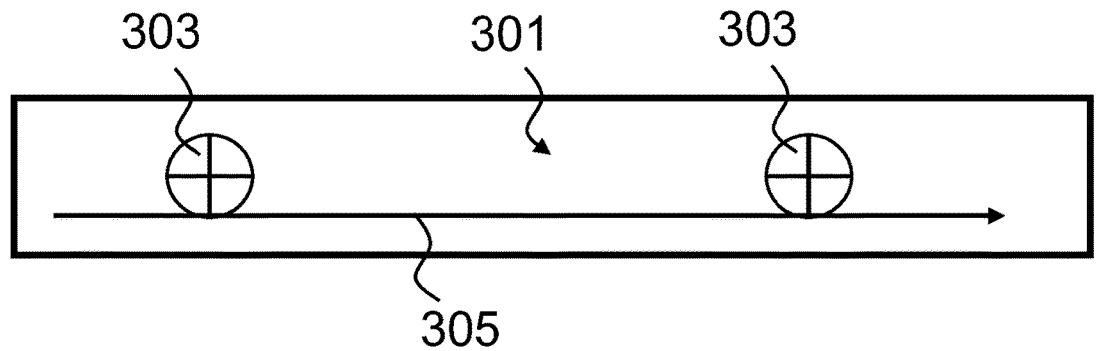
FIG. 3a depicts a schematic representation of an arrangement according to an embodiment example.

FIG. 3a depicts a workpiece 301 with two screw heads 303. An arrow 305 is drawn to indicate a first direction along which the first path is to be coated.

Figure 3B:
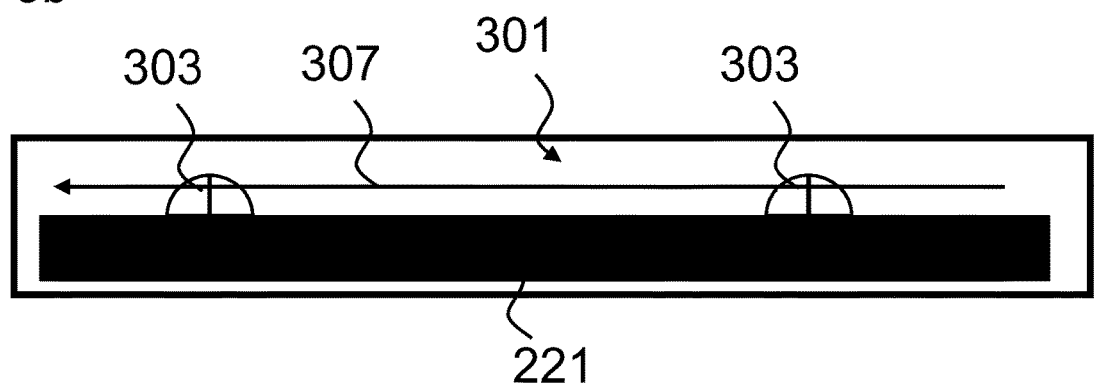

FIG. 3b depicts the state of the workpiece 301 with the two screw heads 303 as the first strip after the first application of the viscous coating material 221. The bolt heads 303 are half covered. Arrow 307 marks a second direction along which the second path is to be coated.

Figure 3C:
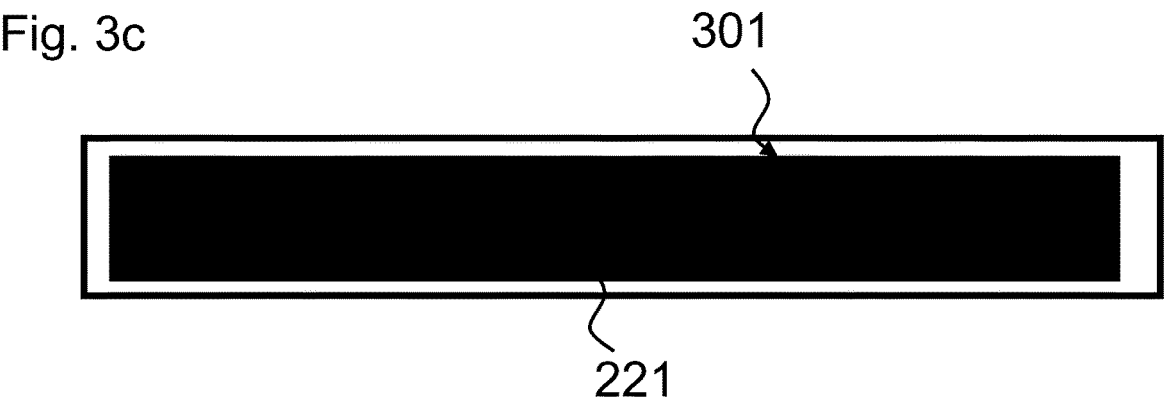
FIG. 3c depicts a further schematic representation of the arrangement according to FIG. 3b.

FIG. 3c depicts the state of the workpiece 301 with the two screw heads 303 as second strip after the first application of the viscous coating material 221. The bolt heads 303 are completely covered. In particular, the viscous coating material 221 is applied uniformly in the area of the screw heads 303 as well as between the screw heads 303.

Figure 4:
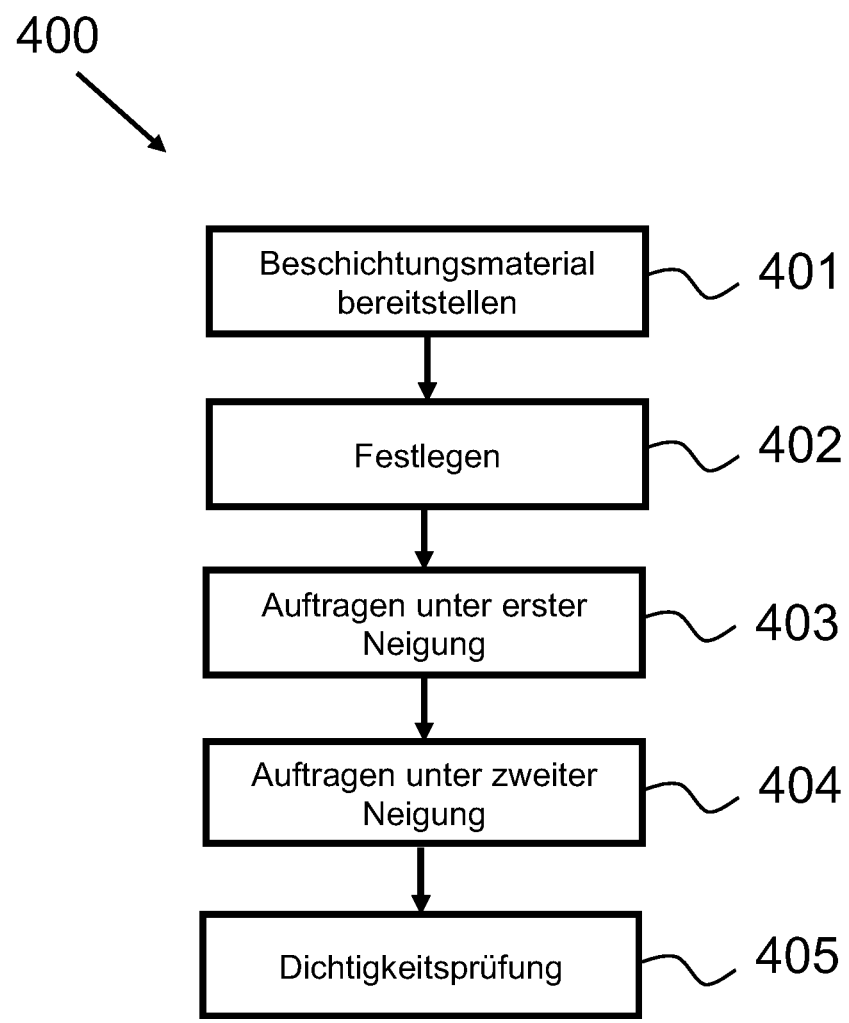
FIG. 4 depicts a flowchart for a process according to an embodiment.

FIG. 4 depicts a flow diagram 400 for a process according to an embodiment.

In a step 401, a viscous coating material 221 is provided. Here, a two-component material is provided, in particular in two separate containers, which are connected to the nozzle 211 by supply lines. The nozzle 211 comprises a screw structure that allows uniform mixing of the two components. In another embodiment, a viscous coating material 221 consisting of a component is used.

In a step 402, an application path is defined. Here, a path may be defined in the control system 213 via coordinates and/or vectors for the nozzle 211 of the application system 201. This may be done separately for each workpiece 203 to be coated. In another embodiment, the application path is determined by the control system 213 based on camera data, which comprises an evaluation of detected screw heads 303.

In all cases, by comparing the programmed first strip and the programmed second strip with camera data, a deviation from the respective strip can be detected and corrected during application, i.e., when the first web or the second web is run. In another embodiment, this is omitted. Tolerances can be selected to be larger, i.e., the application of the first strip and/or the application of the second strip can be made wider.

In one step, 403, the viscous coating material 221 is applied as the first strip with the first inclination 217. The screw heads 303 are at most partially covered by the viscous coating material 221 in particular 50% to 60%. The application direction is carried out in a forward movement of the nozzle 211.

In one step 404, the viscous coating material 221 is applied as a second strip with the second inclination 223. The screw heads 303 are completely covered by the viscous coating material 221. That is, the rest of the screw head 303, which is not covered by the first strip viscous coating material 221, is covered. In particular, the first strip overlaps with the second strip. The application direction is carried out in a backward movement of the nozzle 211, which runs opposite to the forward movement. In another embodiment, the order of the first strip and the order of the second strip are carried out in the same direction. In particular, the application in step 403 and the application in step 404 takes 30 seconds each. In another example, the time is different. This can be determined by the control system 213 based on the drying time of the viscous coating material 221 and the application speed, that is, the speed with which the nozzle 211 is movable. Thus, no skin has formed on the first path when the second path is sprayed over the first path and the first path and the second path can mix together.

The application in steps 403 and 404 can be detected and evaluated by a camera. Here, errors and tolerances can be reacted to. That is, the control system 213 can adjust the nozzle 211 accordingly, in order to achieve a compensation and to enable a similar order.

In a step 405, the tightness of the application is checked. For this purpose, an overpressure is applied to the workpiece 203 with the applied viscous coating material 221. If the pressure holds the same value for a predetermined time, the connection is tight. In another embodiment, a negative pressure is applied.

Some advantageous embodiments of the present invention have been described above. However, the present invention is not limited to the embodiments so described, with the present inventive concept applicable in numerous ways within the scope of the claims.

The invention claimed is:

1. A method for covering a screw head of a screw, which penetrates through a workpiece surface with a viscous coating material, the method comprising the steps of:
    applying a first strip of the viscous coating material onto the workpiece surface at a first inclination relative to the workpiece surface, the first strip of the viscous coating material, after having been applied, at most partially covering the screw head; and
    applying a second strip of the viscous coating material to the workpiece surface at a second inclination relative to the workpiece surface, the second strip of the viscous coating material, after having been applied, overlapping the first strip in such a way that the screw head is fully covered; and
    wherein the first inclination and the second inclination are arranged opposite to one another.

2. The method according to claim 1, wherein the steps of applying further comprise continuously moving a nozzle adapted to spray the viscous coating material.

3. The method according to claim 2, wherein the application of the first strip and the application of the second strip are carried out with opposite application directions of the nozzle.

4. The method according to claim 1, wherein the application of the second strip takes place within at least one of a drying time of the viscous coating material and before a skin has formed on the first strip.

5. The method according to claim 1, wherein the workpiece comprises a battery housing including battery modules arranged in the battery housing.

6. The method according to claim 1, wherein the first inclination and the second inclination are each 5° from an orthogonal orientation relative to the workpiece surface.

7. The method according to claim 1, wherein the partial coverage during application of the first strip comprises at least one of at least 50% of the surface of the screw head and up to 60% of the surface of the screw head.

8. The method according to claim 1, wherein when applying the second strip, the overlap comprises at least 10% of the first strip.

9. The method according to claim 1, further comprising the steps further comprising providing a one- or two-component material as the viscous coating material.

10. The method according to claim 1, further comprising the steps of optically detecting the application of the first and/or second strip by a camera, and correcting the application if it is detected that the application deviates from a desired path.

11. The method according to claim 1, further comprising the steps of defining an application path, the application path having a length, wherein a drying time of the viscous coating material and an application speed are taken into account when defining the application path.

* * * * *